United States Patent
Raghu et al.

(10) Patent No.: US 11,917,575 B2
(45) Date of Patent: *Feb. 27, 2024

(54) AUTOMATIC LOCATION OF ACCESS POINTS IN A NETWORK

(71) Applicant: Hewlett Packard Enterprise Development LP, Houston, TX (US)

(72) Inventors: Vikram Raghu, Santa Clara, CA (US); Eldad Perahia, Park City, UT (US); Sachin Ganu, San Jose, CA (US); Sai Pradeep Venkatraman, Santa Clara, CA (US); Charles Lukaszewski, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,840

(22) Filed: Dec. 23, 2021

(65) Prior Publication Data

US 2022/0116905 A1   Apr. 14, 2022

Related U.S. Application Data

(63) Continuation of application No. 16/831,213, filed on Mar. 26, 2020, now Pat. No. 11,229,000.

(51) Int. Cl.
*H04W 64/00* (2009.01)
*H04W 88/08* (2009.01)
(Continued)

(52) U.S. Cl.
CPC .......... *H04W 64/003* (2013.01); *G06F 17/16* (2013.01); *G06T 17/05* (2013.01); *H04W 4/023* (2013.01);
(Continued)

(58) Field of Classification Search
CPC . H04W 64/003; H04W 64/006; H04W 4/023; H04W 40/248; H04W 88/08; G06F 17/16; G06F 17/05
See application file for complete search history.

(56) References Cited

U.S. PATENT DOCUMENTS 8,509,806 B2 * 8/2013 West ............ H04W 4/029 455/456.1
11,009,000 B2 * 5/2021 Moffat ............ F03B 11/02
(Continued)

FOREIGN PATENT DOCUMENTS

CN 105934685 A 9/2016
CN 107005810 A 8/2017
(Continued)

*Primary Examiner* — Khai M Nguyen
(74) *Attorney, Agent, or Firm* — Hewlett Packard Enterprise Patent Department

(57) ABSTRACT

Embodiments are directed to automatic location of access points in a network. An embodiment of one or more non-transitory computer-readable storage mediums includes instructions for transmitting a request from a computing device to multiple access points in a network to determine a distance between each pair of access points of the multiple access points; receiving at the computing device the determined distances between each pair of access points; generating a proximity matrix containing the determined distances between each pair of access points; solving the proximity matrix to automatically generate a set of locations for the multiple access points; and orienting the generated set of locations for the multiple access points based on known locations of one or more anchor points in a subset of the access points.

20 Claims, 10 Drawing Sheets

(51) Int. Cl.
  *G06T 17/05* (2011.01)
  *H04W 40/24* (2009.01)
  *G06F 17/16* (2006.01)
  *H04W 4/02* (2018.01)

(52) U.S. Cl.
  CPC ....... *H04W 40/248* (2013.01); *H04W 64/006* (2013.01); *H04W 88/08* (2013.01)

(56) References Cited

U.S. PATENT DOCUMENTS

| | | |
|---|---|---|
| 11,064,568 B2 * | 7/2021 | Jester ................ H04W 88/08 |
| 2005/0113107 A1 | 5/2005 | Meunier |
| 2012/0122475 A1 | 5/2012 | Ahmed et al. |
| 2014/0105195 A1 | 4/2014 | Balasubarmaniyan et al. |
| 2014/0187257 A1 * | 7/2014 | Emadzadeh .......... G01S 5/0242 |
| | | 455/456.1 |
| 2014/0226503 A1 * | 8/2014 | Cooper ................ G01S 5/0284 |
| | | 370/252 |
| 2014/0266916 A1 * | 9/2014 | Pakzad .................... G01S 5/14 |
| | | 342/464 |
| 2015/0045022 A1 * | 2/2015 | Prechner ............... H04W 48/16 |
| | | 455/434 |

FOREIGN PATENT DOCUMENTS

| | | | | |
|---|---|---|---|---|
| DE | 602004008555 T2 | 12/2007 | | |
| TW | 201635730 A | * | 10/2016 | ........... G01S 5/0236 |

* cited by examiner

PROXIMITY MATRIX:
TABLE OF DISTANCES BETWEEN ACCESS POINT

|     | AP1   | AP2   | AP3   | AP4   | AP5   | AP6   | AP7   | AP8   | AP9   |
|-----|-------|-------|-------|-------|-------|-------|-------|-------|-------|
| AP1 | 0     | 28.03 | 16.14 | 21.08 | 39.80 | 30.20 | 52.16 | 39.62 | 45.72 |
| AP2 | 28.03 | 0     | 25.55 | 40.80 | 16.38 | 24.31 | 32.79 | 45.68 | 36.09 |
| AP3 | 16.14 | 25.55 | 0     | 15.61 | 30.49 | 15.21 | 39.11 | 24.89 | 30.13 |
| AP4 | 21.08 | 40.80 | 15.61 | 0     | 15.66 | 27.69 | 51.97 | 23.37 | 39.43 |
| AP5 | 39.80 | 16.38 | 30.49 | 45.66 | 0     | 20.11 | 16.68 | 41.74 | 24.58 |
| AP6 | 30.20 | 24.31 | 15.21 | 27.69 | 20.11 | 0     | 24.40 | 22.25 | 15.63 |
| AP7 | 52.16 | 32.79 | 39.11 | 51.97 | 16.68 | 24.40 | 0     | 39.93 | 16.86 |
| AP8 | 39.62 | 45.68 | 24.89 | 23.37 | 41.74 | 22.25 | 39.93 | 0     | 23.50 |
| AP9 | 45.72 | 36.09 | 30.13 | 39.43 | 24.58 | 15.63 | 16.86 | 23.50 | 0     |

*FIG. 5*

INCOMPLETE PROXIMITY MATRIX

|     | AP1   | AP2   | AP3   | AP4   | AP5   | AP6   | AP7   | AP8   | AP9  |
|-----|-------|-------|-------|-------|-------|-------|-------|-------|------|
| AP1 | 0     | 28.03 | 16.14 | 21.08 | 39.80 | 30.20 | 52.16 | 39.62 | N/A  |
| AP2 | 28.03 | 0     | 25.55 | 40.80 | 16.38 | 24.31 | 32.79 | 45.68 | N/A  |
| AP3 | 16.14 | 25.55 | 0     | 15.61 | 30.49 | 15.21 | 39.11 | 24.89 | 30.13 |
| AP4 | 21.08 | 40.80 | 15.61 | 0     | 15.66 | 27.69 | 51.97 | 23.37 | 39.43 |
| AP5 | 39.80 | 16.38 | 30.49 | 45.66 | 0     | 20.11 | 16.68 | 41.74 | 24.58 |
| AP6 | 30.20 | 24.31 | 15.21 | 27.69 | 20.11 | 0     | 24.40 | 22.25 | 15.63 |
| AP7 | 52.16 | 32.79 | 39.11 | 51.97 | 16.68 | 24.40 | 0     | 39.93 | 16.86 |
| AP8 | 39.62 | 45.68 | 24.89 | 23.37 | 41.74 | 22.25 | 39.93 | 0     | 23.50 |
| AP9 | N/A   | N/A   | 30.13 | 39.43 | 24.58 | 15.63 | 16.86 | 23.50 | 0    |

FIG. 7

SOLUTION OF PROXIMITY MATRIX HAVING
MISSING DISTANCE VALUES USING SOLUTION OF
MULTIPLE CLIQUES

Clique-1

|      | AP1   | AP2   | AP3   | AP4   | AP5   | AP6   | AP7   | AP8   | AP9   |
|------|-------|-------|-------|-------|-------|-------|-------|-------|-------|
| AP1  | 0     | 28.03 | 16.14 | 21.08 | 39.80 | 30.20 | 52.16 | 39.62 | N/A   |
| AP2  | 28.03 | 0     | 25.55 | 40.80 | 16.38 | 24.31 | 32.79 | 45.68 | N/A   |
| AP3  | 16.14 | 25.55 | 0     | 15.61 | 30.49 | 15.21 | 39.11 | 24.89 | 30.13 |
| AP4  | 21.08 | 40.80 | 15.61 | 0     | 15.66 | 27.69 | 51.97 | 23.37 | 39.43 |
| AP5  | 39.80 | 16.38 | 30.49 | 45.66 | 0     | 20.11 | 16.68 | 41.74 | 24.58 |
| AP6  | 30.20 | 24.31 | 15.21 | 27.69 | 20.11 | 0     | 24.40 | 22.25 | 15.63 |
| AP7  | 52.16 | 32.79 | 39.11 | 51.97 | 16.68 | 24.40 | 0     | 39.93 | 16.86 |
| AP8  | 39.62 | 45.68 | 24.89 | 23.37 | 41.74 | 22.25 | 39.93 | 0     | 23.50 |
| AP9  | N/A   | N/A   | 30.13 | 39.43 | 24.58 | 15.63 | 16.86 | 23.50 | 0     |

Clique-2

*FIG. 9*

AUTOMATIC LOCATION OF ACCESS POINTS IN A NETWORK

CROSS REFERENCE TO RELATED APPLICATIONS

This application is a continuation of, and claims the priority benefit of, U.S. patent application Ser. No. 16/831,213, filed on Mar. 26, 2020, now U.S. Pat. No. 11,229,000, which is incorporated herein by reference in its entirety.

BACKGROUND

The deployment of multiple access point (APs) in a large facility is a complex undertaking. The deployment requires balancing of numerous factors in determining the best location of each of a large number of access points. Further, the planned placement of the access points may require modification as new conditions are discovered or as changes occur within the facility.

Further, once the access points are installed, later determining the precise location of each access point for servicing or replacement can be challenging. The access points may be well hidden behind walls, ceilings, and other structures, thus requiring that the access points be located based upon recorded information or through a search process.

For example, the location of access points may be determined based on an access point map if such map exists. However, generation of an access point map is difficult and labor-intensive, and the map may be inaccurate or out of date when the map is actually needed.

If a map of access points is unavailable or is unhelpful because of inaccuracy, then the determination of the location of access points may require electronic search means, such as use of a spectrum analyzer. A search for access points in this manner is extremely time consuming, and may not be helpful if an access point has failed, or if a particular signal is difficult to track.

BRIEF DESCRIPTION OF THE DRAWINGS

Embodiments described here are illustrated by way of example, and not by way of limitation, in the figures of the accompanying drawings in which like reference numerals refer to similar elements.

FIG. 5 is a proximity matrix generated in performance of automatic location of a set of access points, according to some embodiments;

FIG. 7 is an incomplete proximity matrix for a set of access points generated in performance of automatic location of the set of access points, according to some embodiments;

FIG. 9 is an illustration of generation of a solution to a proximity matrix having missing distance values in performance of automatic location of a set of access points, according to some embodiments.

DETAILED DESCRIPTION

Figure 1A:
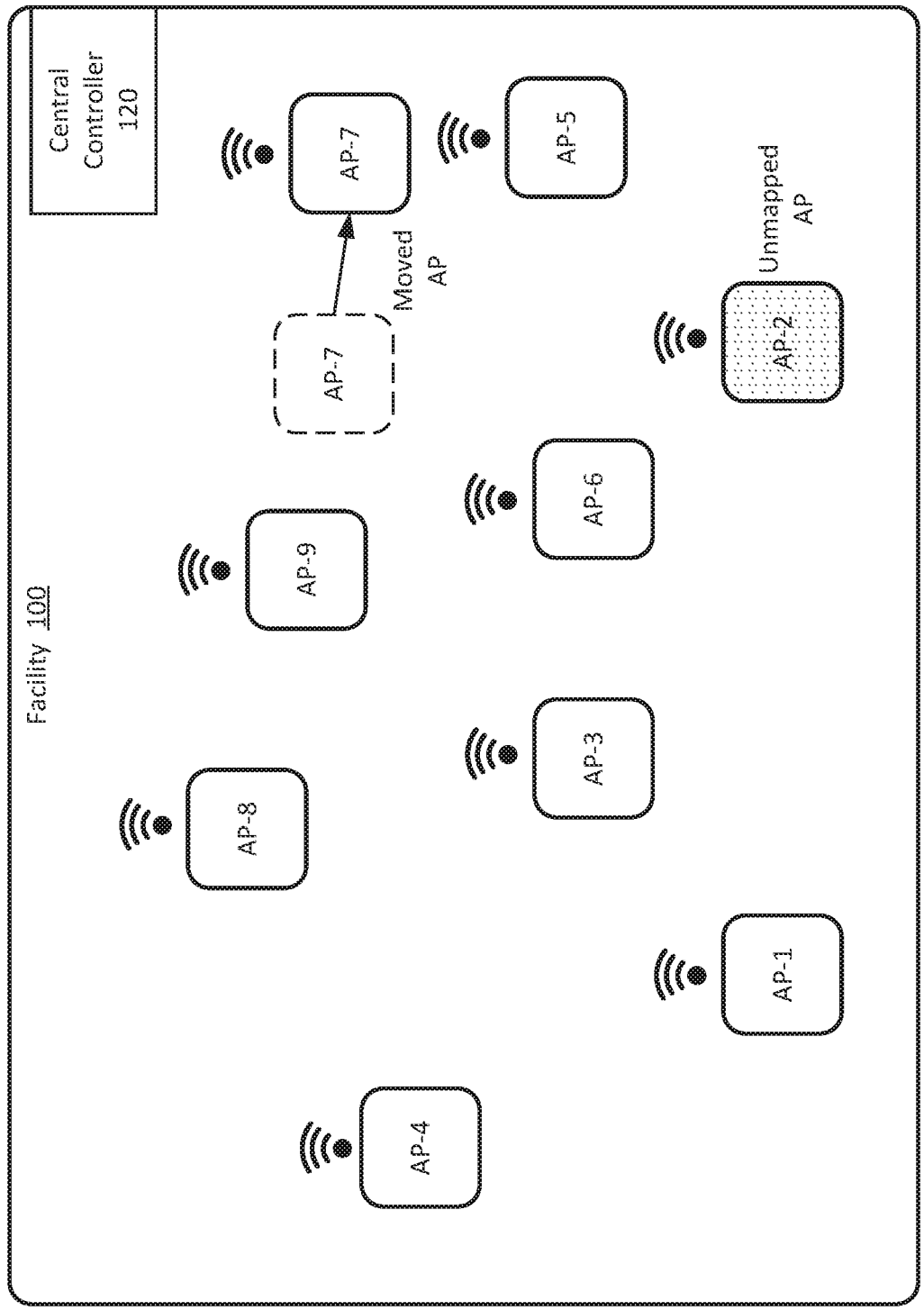
FIG. 1A is an illustration of a facility including multiple access points in a network.

Embodiments described herein are directed to automatic location of access points in a network.

In order for an operator who is deploying a large number of access points (APs) to generate and maintain an accurate AP installation map (such as generated with Visual RF or another software tool for planning) using conventional means, a labor intensive manual effort is generally needed to precisely note each AP location and mark the location on a floor map during or after AP installation. With such a manual process, there is a high probability of human error in documenting each AP location.

In addition, access points that are deployed in large installations are frequently displaced from the original intended location due to a variety of reasons, such as unfavorable mounting support for the AP, lack of equipment to reach a specific spot, a physical obstruction that was not marked in the floorplan, and many other reasons. In order for the AP map to be complete and up-to-date at all times, any changes to the customer site must be logged and the AP map updated promptly. If an AP map is not accurate, upgrading to new hardware or replacing faulty hardware may require many hours of labor and a great amount of cost to locate all the access points, which are often mounted in ceilings, placed behind drywall, or otherwise hidden from view. In certain installations, the operator may specifically wish to hide all AP installations and markings from view of facility customers, and thus there may be few, if any, visual clues as to the AP locations.

In some embodiments, an apparatus, system, or process provides automatic location of access points after deployment of APs is complete. The generated set of access point locations may be utilized for any purpose relating to the access points. For example, the generated set of locations for the access points may be used to generate a map of the access points, or any other representation of the access point locations. The automatic generation of access point locations may be utilized to save the cost and effort required for carefully recording and modifying a map for AP deployment in a complex environment, or for discovering AP locations that are hidden within a building when there is a failure, an upgrade, or other issue requiring knowledge of the location of APs. Further, accurate AP placements are increasingly important as more customers implement indoor location services that are based on the AP operation, and knowledge of the location of the access points is necessary for accurate location services.

Embodiments of automatic AP location may be utilized in any facility that includes multiple access points, with automatic AP location being of particular value in large office or campus complexes, stadiums, casinos, and other facilities having expansive environments that are difficult to map or search. Certain types of facilities, such as hospitals, public safety facilities (such as police stations), airports, and casinos, are rarely if ever closed, and thus any search for access points must occur while the facility is open and operating.

As used herein, access point (AP) (also referred to as a wireless access point (WAP)) refers to a networking hardware device that allows devices to connect to a wired network, including connection to the Internet or an intranet. The AP may connect to a router (via a wired network) as a standalone device or may be an integral component of the router itself. An access point may include, but is not limited to, a Wi-Fi access point operating under operating under one or more IEEE (Institute of Electrical and Electronics Engineers) 802.11 standards. An access point may also operate using any other wireless communication technology, including, for example, cellular communications (including 4G and 5G technology), Bluetooth, ZigBee, and other technologies.

FIG. 1A is an illustration of a facility including multiple access points in a network. As illustrated in FIG. 1A, a particular facility 100 may have a large number of access points that are scattered throughout the environment to provide wireless communication coverage. This particular example illustrates a set of nine access points designated as AP-1 through AP-9, but any number may be present within a facility. Further, while the access points are shown in two dimensions (2D) in FIG. 1A and FIG. 1B for ease of illustration, the APs will generally be scattered in three dimensions (3D), at varying heights or on different levels of a facility. In some embodiments, the network may include a central controller 120 to control certain operations of the access points AP-1 to AP-9.

In a conventional operation, it would be necessary to physically map the location of AP-1 through AP-9 as such APs are installed (which may utilize Visual RF or another software tool), and to maintain the accuracy of the maps as any modifications to the network are made. However, human error and other factors may create significant difficulties in such operation. For example, in the facility 100 it is possible that one or more APs, such as AP-2, are not mapped because the APs were later added or simply forgotten for purposes of mapping. Further, one or more APs, such as AP-7 in FIG. 1A, may not be in the mapped location because such AP was moved, either in installation or at a later time because of unrelated construction or repair. As a result, the AP map, if such map exists or can be found, may be far from accurate and up to date. Mapping of AP-1 through AP-9 may be difficult and time consuming, and the generated map may not be sufficient to enable location of each access point when this is required for servicing, upgrade, or modification of the AP structure.

Figure 1B:
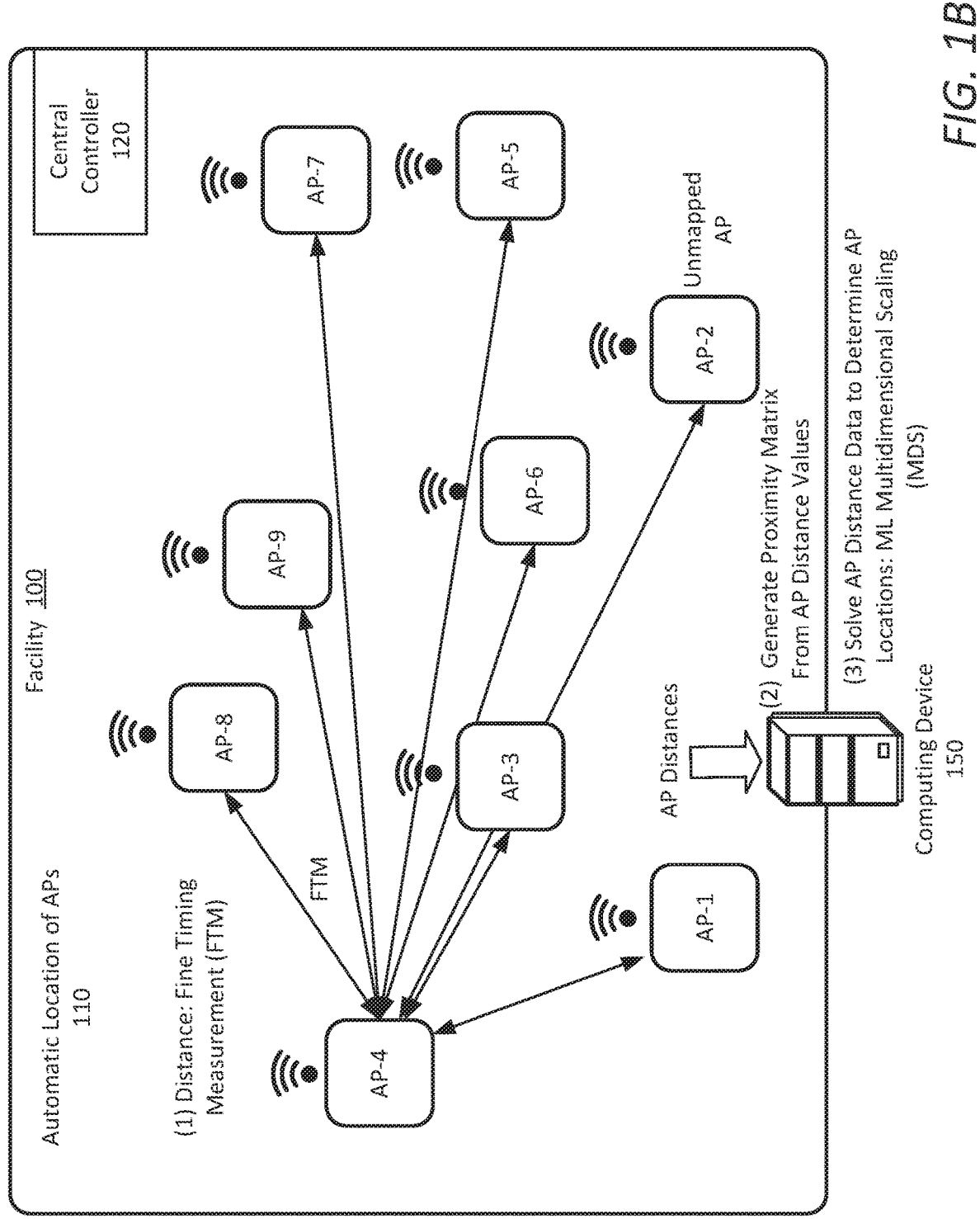
FIG. 1B is an illustration of automatic location of multiple access points within a facility, according to some embodiments.

In some embodiments, automatic location of the access points AP-1 through AP-9 is performed, as further illustrated in FIG. 1B. The automatic determination of AP locations may, for example, be used to avoid the need to create and maintain an AP map as the access points are installed or modified.

Figure 2:
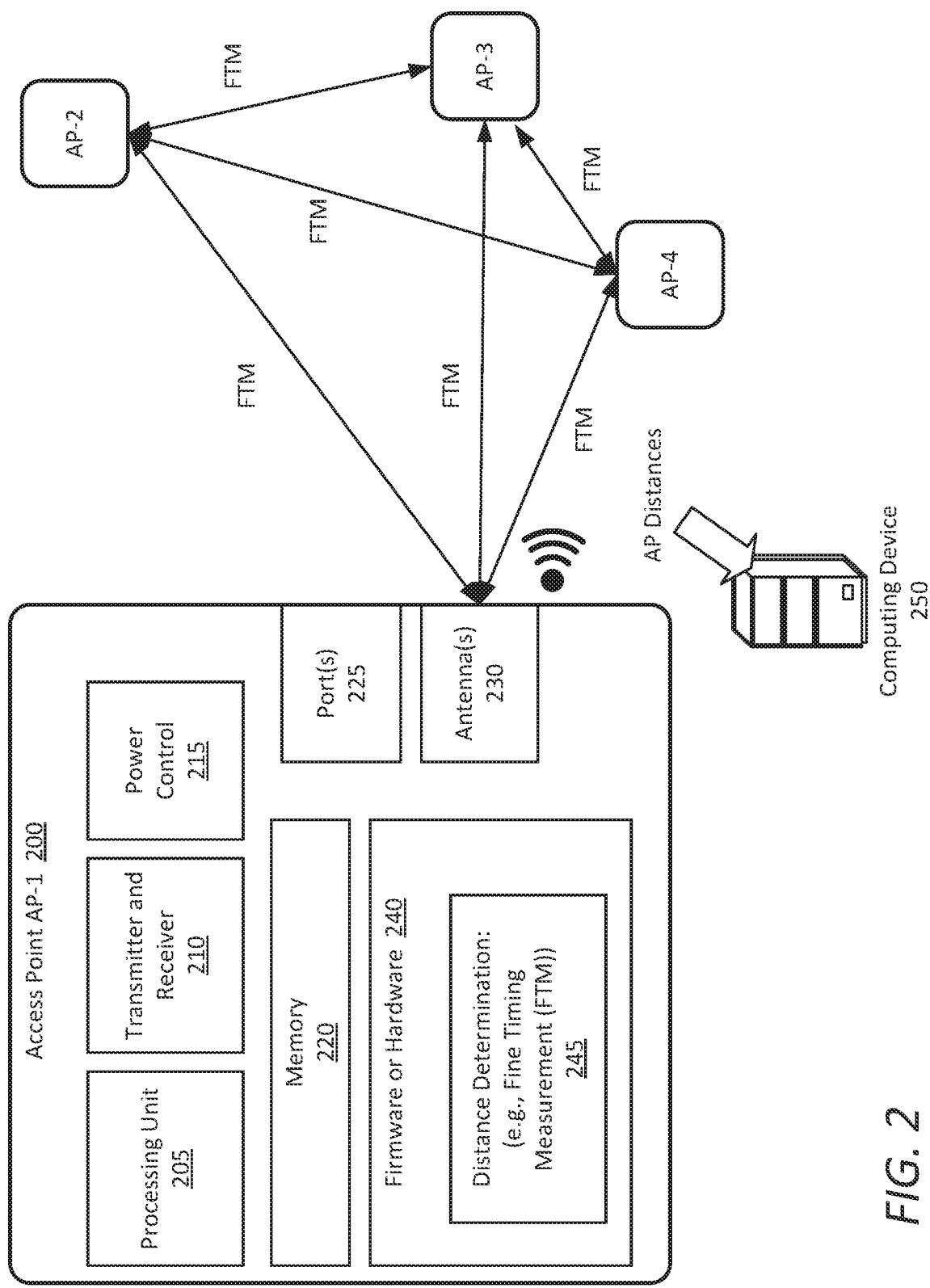
FIG. 2 is an illustration of an access point in a system to provide automatic AP location according to some embodiments.

FIG. 1B is an illustration of automatic location of multiple access points within a facility, according to some embodiments. As illustrated in FIG. 1B, a particular facility 100 includes a set of access points, AP-1 through AP-9, that are scattered throughout the environment to provide wireless communication coverage. Each AP may, for example, be as illustrated in FIG. 2. In some embodiments, an apparatus, system, or process is to perform automatic location of each AP location 110 in either two dimensions or three dimensions through a combination of accurate determinations of distances between each pair of APs of the set of APs, and locating access points based on the determined distances. The automatic AP location 110 may be performed as follows:

(1) Distance Determination: In some embodiments, the APs are instructed to determine a distance between each pair of APs. The APs may, for example, determine the distances using AP signaling, such as using measurement of time of flight of signals between the APs to determine the distance between each pair of APs. For example, a distance determination is made between AP-4 and each other AP of the set of APs, as illustrated in FIG. 1B, and between every other pair of APs. The distance determination may include the use of Fine Timing Measurement (FTM) between each pair of APs. FTM is a feature provided in IEEE 802.11mc for determination of distances between stations utilizing time of flight of frame exchange between a sending station and a receiving station. FTM may be utilized to provide accurate measurement of distances based on direct signal transmissions (i.e., line-of-sight in terms of signal transmission) between each pair of access points in a facility.

Figure 3:
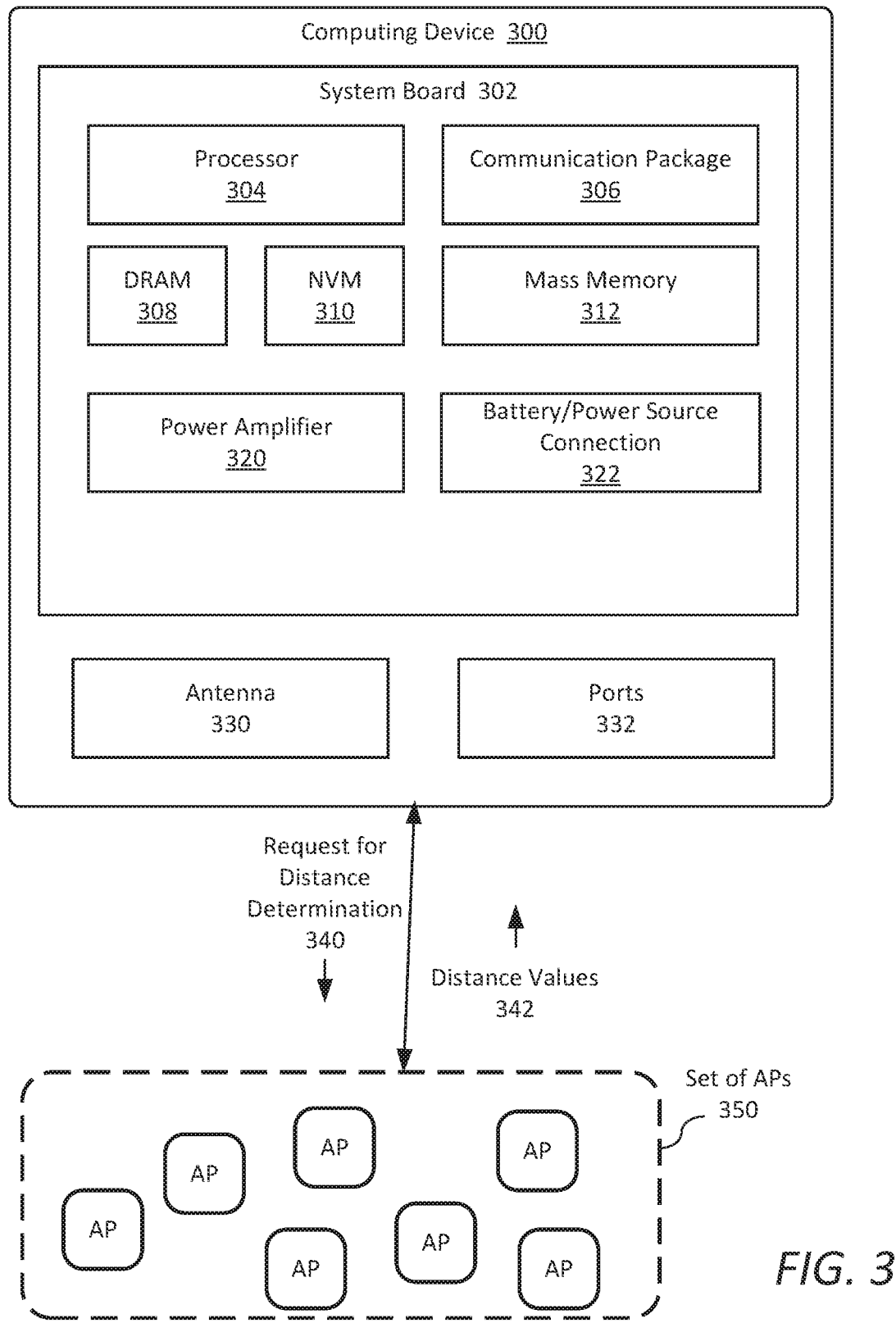
FIG. 3 illustrates a computing device to provide automatic AP location, according to some embodiments.

(2) Generation of Proximity Matrix: The result of the distance measurement process between each pair of access points is a set of data describing distances between all APs. In some embodiments, a table may be generated to represent the set of data (such as illustrated in FIG. 5). The table may be referred to as a distance matrix or proximity matrix. A proximity matrix is a representation, such as in the form of a two-dimensional array, of pairwise distances between the elements of a set, which in this case is the set of APs AP-1 through AP-9. For example, as illustrated in FIG. 1B, the distance measurement for each pair of access points may be received by a computing device 150, such as a server, laptop computer, or other device including computing capabilities, which then generates a proximity matrix based on the received data measurements. The computing device 150 may, for example, be a computing device 300 as illustrated in FIG. 3.

Figure 8:
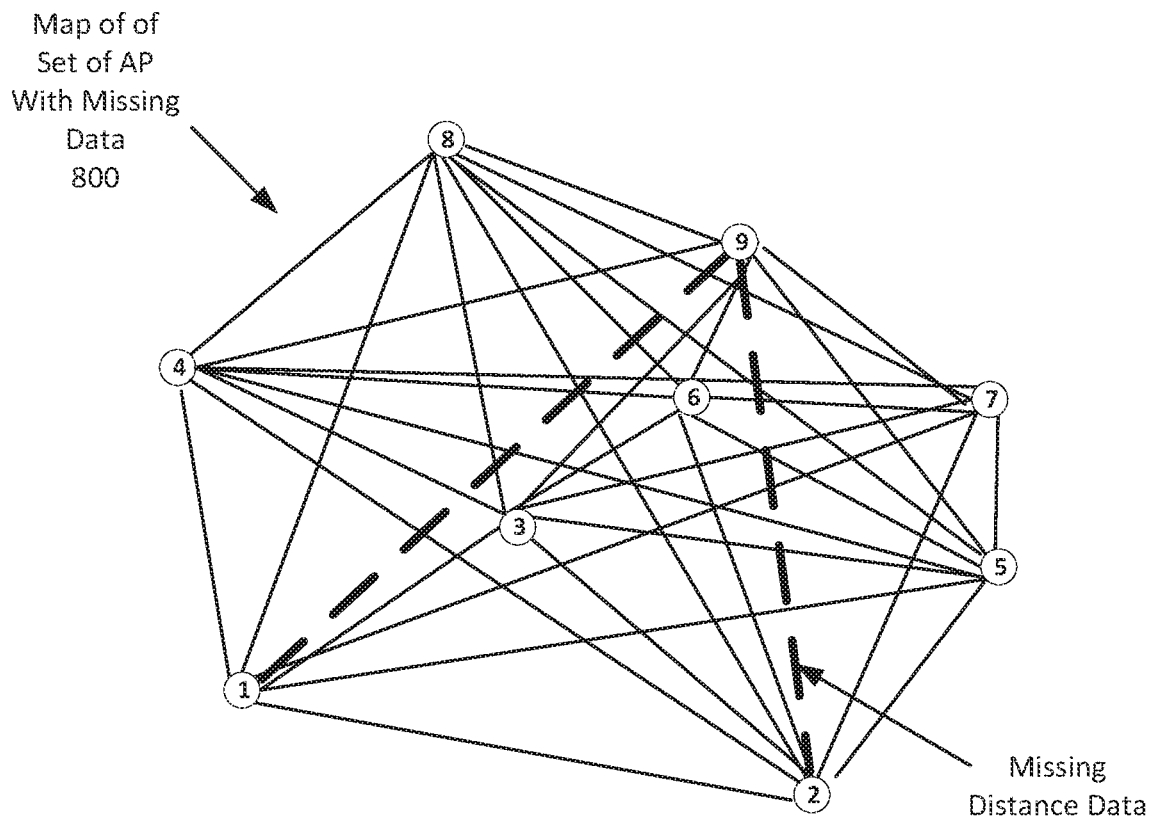
FIG. 8 is an incomplete mapping of a set of access points this is generated from an incomplete proximity matrix in performance of automatic location of the set of access points, according to some embodiments.

In some embodiments, an apparatus, system, process may further provide for calculation or estimation of missing distance values, or the correction of erroneous distance values, in the proximity matrix. Missing or erroneous values may result from pairs of APs that are not within direct signal transmission of each other, such as in circumstances in which a structure or transmitter blocks or interferes with the signal between a sending AP and a receiving AP. For example, computing device 150 may detect missing data or erroneous data (such as by identifying distance measurements that are outside an expected range of values) and provide a correction process to calculate or estimate the needed distance values. A process may include a process such as illustrated in FIGS. 8 and 9.

(3) Solving of AP Distance Data to Locate APs: The proximity matrix data does not in itself describe the physical locations of the access points that represented in the matrix. In some embodiments, the proximity matrix is solved to determine a location of each AP in relation to each of the other APs. In some embodiments, the determined locations may be used in generating a map of the APs.

However, the solving of a proximity matrix with a large number of values is computationally very difficult. In some embodiments, determining location of access points from the proximity data is performed utilizing machine learning (ML), and more specifically is solved by computing device 150 using the ML technology Multidimensional Scaling (MDS). MDS may be applied to generate a set of locations representing the relative positions of a number of objects based upon a table of the distances between them. The set of locations may be in any number of dimensions, and more specifically, in terms of AP mapping in a facility, may provide both 2D and 3D mapping based on a proximity table describing the distances between each pair of APs. Stated mathematically, MDS may be applied to translate information about pairwise distances among a set of n objects into a configuration of n points mapped into cartesian space.

Figure 6:
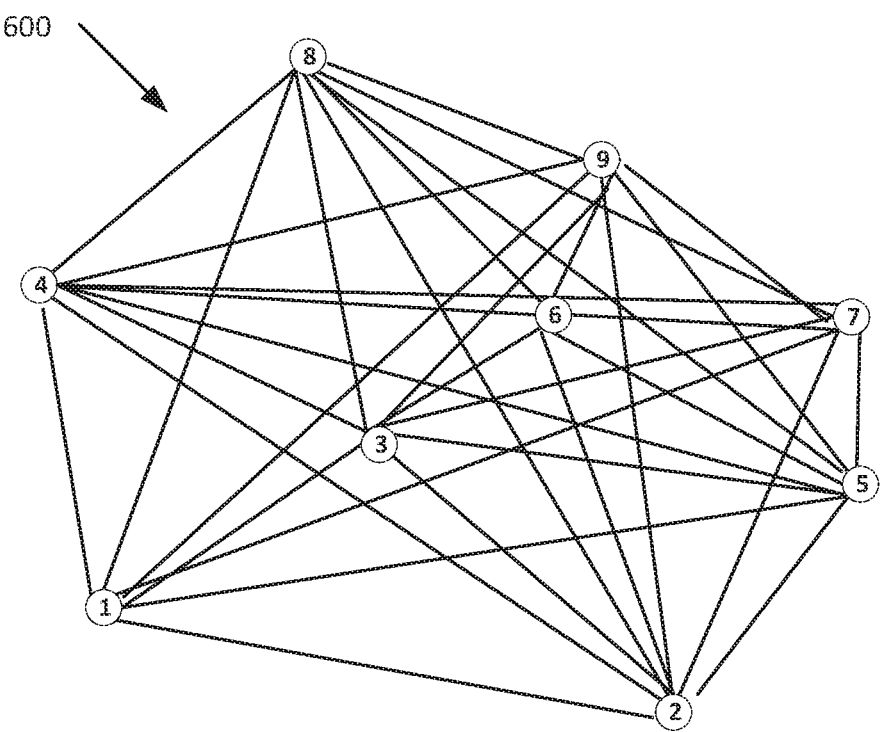
FIG. 6 is a map of a set of access points that is automatically generated from a proximity matrix, according to some embodiments.

The result of the solving of the AP distance data for a plurality of APs is a full set of locations of the access points, such as illustrated in the map of access points in FIG. 6. However, while the set of AP locations provides the relationship of the locations all access points, this does not resolve the rotation and inversion of the locations in 3D (or 2D) space, i.e., the set of locations may be oriented in any direction, or may be inverted, while satisfying the AP distance values. In some embodiments, the rotation and inversion of the set of locations is resolved, such as by computing device 150, using one or more actual known locations of access points. Such known access points may be referred to as anchor points, and the location of at least three anchor points is generally required to resolve the mapping of the proximity matrix in 3D space. However, the actual number of anchor points required may depend on the particular circumstances. The location of the anchor points may be determined by any means, including, but not limited to, use of GPS (Global Positioning System) data to provide the needed coordinates. In some embodiments, the solving of the proximity matrix, including the necessary number of known anchor points, results in generation of a properly oriented set of locations of the access points.

FIG. 2 is an illustration of an access point in a system to provide automatic AP location according to some embodiments. An access point 200, designated as AP-1, is one of a set of APs in a facility. In a simplified drawing, the set of APs includes four APs, AP-1, AP-2, AP-3, and AP-4. Each access point 200 may include, but is not limited to, an access point operating under one or more IEEE (Institute of Electrical and Electronics Engineers) 802.11 standards. Each access point 200 may include a processing unit 205, a transmitter and receiver 210 for transmission of signals, a power control 215, a memory for storage of data 220, one or more ports 225 for wired network connections, and one or more antennas 230 for wireless signal communications.

Each access point 200 further includes firmware or hardware or both 240. In some embodiments, the firmware or hardware 240 includes instructions or hardware to provide for determination of distance between the access point and another access point 245. In some embodiments, the distance determination by the access points utilizes measurement of time of flight of signals between the access points to determine the distance between each pair of APs. In particular the measurement of distance may include support for Fine Timing Measurement (FTM).

In some embodiments, upon receipt of a request, such as request from a computing device 250, each access point AP-1 to AP-4 is to provide for distance measurement between each other AP to provide a set of pairwise distance measurements between the APs. For example, a distance determination, such as an FTM measurement, is performed between AP-1 and each other AP, this being AP-2, AP-3, and AP-4 in this example, as well as each other pair of APs.

In some embodiments, each inter-AP distance value is then provided to the computing device 250, such as computing device 300 illustrated in FIG. 3. The computing device 250 then is to generate a proximity matrix based on the distance measurements, and to solve the proximity matrix to automatically determine location of the APs in relation to each other. In some embodiments, the determined set of locations may be used to produce an AP map for the set of APs, AP-1 to AP-4.

FIG. 3 illustrates a computing device to provide automatic AP location, according to some embodiments. In some embodiments, the computing device 300 may include a device to communicate with a set of access points 350 in a network to perform automatic location of such APs. The computing device 300 may include a system board 302, with the system board 302 including a number of components, including but not limited to a processor 304 and at least one communication package or chip 306, with the communication package 306 being coupled to one or more antennas 330 to perform wireless communications and/or coupled with one or more ports to perform wired communications, including communications with one or more of the access points 350. The computing device 300 may further include volatile memory (e.g., DRAM) 308, nonvolatile memory (e.g., ROM or flash memory) 310, a mass storage device (such as a hard disk drive or solid state drive (SSD)) 312, a power amplifier 320, and a battery or power source connection 322. The computing device will include other elements that are not illustrated and are beyond the scope of this discussion.

The communication package 306 enables wireless and/or wired communications for the transfer of data to and from the computing device 300, including transmission to and from the access points 350. The communication package 306 may implement any of a number of wireless or wired standards or protocols, including but not limited to Wi-Fi (IEEE 802.11 family), WiMAX (IEEE 802.16 family), Bluetooth, and other wireless technologies.

In some embodiments, the computing device 300 is to transmit to the access points 350 one or more requests for distance determination between each pair of access points 340. The distance determination may include performance of signal transmission for distance measurements between each pair of APs, such as the FTM processes illustrated in FIG. 2. It is noted that a request may be transmitted to the APs in multiple ways, depending on the configuration of a network. The computing system is then to receive the determined distance values between the pairs of APs 342.

In some embodiments, the computing system 300 is then to generate a proximity matrix representing the distance values, such as illustrated in FIG. 5, and then is to proceed to solve the proximity matrix, such as applying MDS to translate information about pairwise distances among the set of APs into a configuration of points mapped into cartesian space, such as illustrated in FIG. 6.

Figure 4:
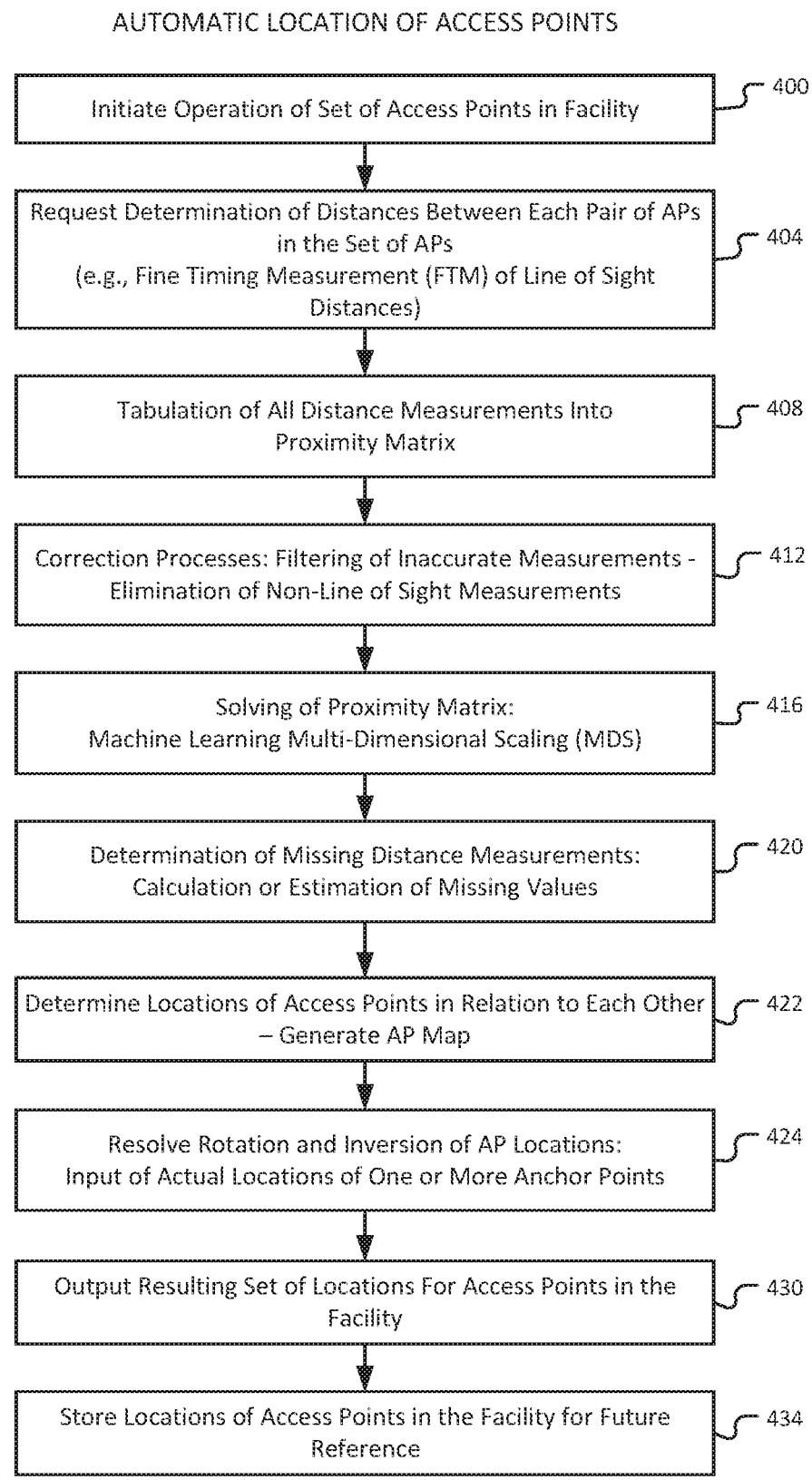
FIG. 4 is a flowchart to illustrate a process for automatic location of a set of access points, according to some embodiments.

FIG. 4 is a flowchart to illustrate a process for automatic location of a set of access points, according to some embodiments. A set of access points may be installed in a particular facility, such as illustrated in FIG. 1A. The facility may be any building or complex, and there may be any number of access points within the set. In some embodiments, a process for machine learning based automatic location of the access points may include:

Operation of the set of access points within the facility may be initiated 400, thereby enabling the transmission of frames between pairs of access points. In some embodiments, a request is made for determination of distances between each pair of access points in the set of APs 404. The request may be made by a computing device, such as the computing device 300 illustrated in FIG. 3, or other similar apparatus. The determination of distances may include, for example, measurement performed using signal transmission between each pair of access points, such as utilizing FTM technology to determine line of sight distance measurements. The distance determination operation results in a set of pairwise distance values for the set of access points. The determined distance values between the pairs of access points are then tabulated into a proximity matrix 408.

In some embodiments, the process may further include one or more correction process to address inaccurate data 412. The correction processes may include filtering of inaccurate measurements, such as eliminating measurements resulting from non-line-of-sight signals in which a signal may bounce and thus cause significant errors in determined locations.

In some embodiments, the proximity matrix is solved utilizing the MDS technology 416, such as illustrated in FIG. 6, with each node representing an access point. The solution of the proximity matrix provides the location of the access points in relation to each other.

However, determination of the locations of the APs requires a full set of values for the proximity matrix, which often is not possible because each AP in the set may not receive a direct signal from each other AP due to obstructions, excessive distances, interference, or other reasons. Missing data within the proximity matrix, such as illustrated in FIG. 7, results in an incomplete or insolvable set of locations, such as illustrated in FIG. 8. In some embodiments, the process includes determination of missing distance measurements by calculating or estimating the missing values 420 In some embodiments, a process for solving the proximity matrix with the missing data may include dividing the proximity matrix into multiple cliques, and solving the cliques, as illustrated in FIG. 9.

In some embodiments, a set of locations of the access points in relation to each other is determined based on the solution of the proximity matrix 422. In some embodiments, a map of the access points (referred to herein as an AP map) may be generated based on the determined locations of the access points. The generated AP map may be a 2D or 3D map representing the locations of the APs in relation to each other, such as illustrated in FIG. 6.

However, while the set of locations of the access points provides the distance relationship between all access points, this does not resolve the rotation and inversion of the locations in 3D (or 2D) space. In some embodiments, the rotation and inversion of the AP locations are resolved using one or more actual known locations of access points 424. The known access points, referred to as anchor points, are applied in the solving of the proximity matrix to generate a fully resolved set of access point locations. The actual locations of the anchor points may be determined by any means, including, for example, use of GPS location data. The locations of at least three anchor points are generally required to resolve the locations of the access points represented by the proximity matrix in 3D space, but the actual number required may depend on the circumstances. In the example illustrated in FIGS. 1A and 1B, the anchor points may be AP-1, AP-2, and AP-3 (or any other three access points) of the set of access points AP-1 to AP-9.

The process may then output the resulting set of locations for the access points that are present within the facility 430. The resulting AP locations may be stored 434, such as in the form of an AP map, to allow reference as needed to locate individual access points within the facility. Further, upon changes being made to the AP structure of the facility, the full process illustrated in FIG. 4 may be repeated to generate a new set of locations for the access points. In some embodiments, a new set of AP locations may be compared to a previous set of AP locations to generate a listing of modifications, which will indicate, for example, access points that have been added, removed, or moved to a different location between the time the current location of the access points and the time of the prior location of the access points.

FIG. 5 is a proximity matrix generated in performance of automatic location of a set of access points, according to some embodiments. In some embodiments, in a system including a set of access points, such as illustrated in FIG. 1A, a distance determination process, such as utilizing FTM, is performed between each pair of APs in response to a request. The result is a set of pairwise distances for the set of access points.

In some embodiments, the distance values between each pair of access points are tabulated into a proximity matrix, as illustrated in FIG. 5. For example, the distance between AP-1 and AP-2 is 28.03 feet, the distance between AP-3 and AP-5 is 30.49 feet, etc.

In some embodiments, the proximity matrix may then be solved, such as processing the proximity matrix using MDS, to generate a set of locations for the access points based upon the determined distances between each pair of access points. The determined set of locations may be utilized for one or more operations. For example, a map of the access points may be generated based on the determined set of locations for the access points. The resulting map of the plurality of access points may be as illustrated in FIG. 6.

FIG. 6 is a map of a set of access points that is automatically generated from a proximity matrix, according to some embodiments. In some embodiments, upon generating a proximity matrix for a set of access points in a facility, such as the proximity matrix illustrated in FIG. 5, the proximity matrix is solved to generate a set of locations of the access points in relation to each other. The set of locations for the access points may be utilized to generate an access point map 600 that illustrates the distance relationships between the access points, wherein each numbered node in the AP map 600 represents an access point in 3D space. For example, the node 1 represents the location of AP-1 in terms of distances between each other AP of the set of APs. In some embodiments, the solving of the proximity matrix may include the application of MDS to generate the locations of the access points.

While the set of locations of the access points provides the relationship of all access points in relation to each other, the locations are not resolved with regard to rotation or inversion in 3D space. In some embodiments, the rotation and inversion of the set of AP locations is resolved using one or more actual known locations of access points (referred to anchor points). For example, the location at least three anchor points may in general be used to resolve the locations of the access points in 3D space.

FIG. 7 is an incomplete proximity matrix for a set of access points generated in performance of automatic location of the set of access points, according to some embodiments. FIG. 8 is an incomplete mapping of a set of access points that is generated from an incomplete proximity matrix in performance of automatic location of the set of access points, according to some embodiments. A proximity matrix may be generated for a set of access points in a facility using, for example, FTM processes. However, the resulting proximity matrix may be missing certain distances because the respective pair of access points are unable to generate an distance measurement, such as because the access points are too distant from each other or because signals between the access points are not within direct signal transmission of each other, such as because a structure or transmitter blocks or interferes with the signal between a sending AP and a receiving AP.

In the particular example illustrated in FIG. 7, the distance measurements between AP-1 and AP-9, and the distance measurements between AP-2 and AP-9, are not provided. As illustrated in FIG. 1A, these pairs of access points are at a significant distance from each other, and may be unable to provide direct, line of sight signaling because of obstruction or interference. It is noted that FIG. 7 provides a relatively simple example for purposes of illustration of missing data and the generation of such missing data. Missing data may occur anywhere within the proximity matrix, thus requiring a more complex solution of the proximity matrix.

FIG. 8 illustrates a resulting AP map 800 that is missing the distances between AP-1 and AP-9, and between AP-2 and AP-9. While this mapping 800 is shown in FIG. 8 for illustration of the missing data, the MDS process may in general be unable to generate any AP location result because of the missing data.

FIG. 9 is an illustration of generation of a solution to a proximity matrix having missing distance values in performance of automatic location of a set of access points, according to some embodiments. In some embodiments, in a system including a set of access points, such as illustrated in FIG. 1A, a process for distance determination between access points, such as utilizing FTM technology, is performed between each pair of APs to determine a set of pairwise distances for the set of APs. However, certain distances are missing, and the resulting proximity matrix thus has incomplete data. In the particular example illustrated in FIGS. 7 and 8, the distance measurements between AP-1 and AP-9, and the distance measurements between AP-2 and AP-9, are not provided, and the resulting proximity matrix is incomplete.

As used herein, a set of points representing a complete proximity matrix is referred to as a clique. In some embodiments, an incomplete proximity matrix, such as illustrated in FIG. 7, is divided into multiple cliques, and the cliques are each solved to generate a complete set of locations for the access points. In the particular example illustrated FIG. 9, the incomplete proximity matrix may be divided into two cliques, Clique-1 and Clique-2, each such clique representing a complete proximity matrix. Assuming that the anchor points are AP-1, AP-2 and AP-3, Clique-1 may be solved with this set of anchor points as these access points are within Clique-1. However, when solving Clique-2, AP-1 and AP-2 cannot be used because these are not part of Clique-2. Instead, the output from the solving of Clique-1 may be used to obtain the coordinates of AP-4 and AP-5, and the processing of Clique-2 may use AP-3, AP-4, and AP-5 as anchor points, thereby generating a complete set of data from the two solutions.

In general, the process of stitching together solutions for cliques allows for scaling to a large number of APs with a particular set of anchor points, such as three initial anchor points. However, when scaling to a larger number of APs it becomes much more difficult to effectively split the original proximity matrix into cliques. In order to perform this division of the proximity matrix, the Bron-Kerbosch maximal clique finding algorithm may be applied, wherein this algorithm allows the generation of a minimized set of cliques to be solved and stitched together to generate the complete set of access point locations.

For a particular clique that is solved based upon a new set of anchor points generated from a previous solution, the generated anchor points may include an error that results from inaccuracy of the distances reported. Such errors will accumulate as the process progresses away from the first clique that is solved. In some embodiments, in order to improve the final output, a process may include choosing multiple starting points within the set of access point locations to generate multiple solutions, and then merging the solutions together to reduce the total error.

In some embodiments, an incomplete proximity matrix may alternatively be filled using a "best-guess" value for the distance. For example, distance values may be generated by applying Dijkstra's shortest path algorithm to the incomplete proximity matrix. For the proximity matrix shown in FIG. 7 and the mapping shown in FIG. 8, there are two missing links. Using Dijkstra's algorithm, the first link (1-9) has the path (1-6-9) as the shortest alternative path between links, with the sum of distances equaling 45.83. Similarly, the second link (2-9) has the shortest alternative path as (2-6-9) between the links, with the sum of distances equaling 39.94. Such values based on one or more alternative paths thus may be applied in estimating the missing distances to complete the proximity matrix, allowing for completion of the automatic generation of access point locations.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums have stored thereon executable computer program instructions that, when executed by one or more processors, cause the one or more processors to perform operations including transmitting a request from a computing device to a plurality of access points in a network to determine a distance between each pair of access points of the plurality of access points; receiving at the computing device the determined distances between each pair of access points of the plurality of access points; generating a proximity matrix containing the determined distances between each pair of access points of the plurality of access points; solving the proximity matrix to automatically generate a set of locations for the plurality of access points; and orienting the generated set of locations for the plurality of access points based on known locations of one or more anchor points in a subset of the plurality of access points.

In some embodiments, a computing device includes one or more processors; a memory to store data; and a transmitter and receiver, wherein the computing device is to transmit a request to a plurality of access points in a network to determine a distance between each pair of access points of the plurality of access points; receive the determined distances between each pair of access points of the plurality of access points; generate a proximity matrix containing the determined distances between each pair of access points of the plurality of access points; solve the proximity matrix to automatically generate a set of locations for the plurality of access points; and orient the generated set of locations for the plurality of access points based on known locations of one or more anchor points in a subset of the plurality of access points.

In some embodiments, a method for automatic generation of access point locations includes transmitting a request from a computing device to a plurality of access points in a network to determine a distance between each pair of access points of the plurality of access points, wherein the determination of the distance between each pair of access points includes measurement of time of flight of signals transmitted between each pair of access points; receiving at the computing device the determined distances between each pair of access points of the plurality of access points; generating a proximity matrix containing the determined distances between each pair of access points of the plurality of access points; solving the proximity matrix to automatically generate set of locations for the plurality of access points; and orienting the generated set of locations for the plurality of access points based on known locations of one or more anchor points in a subset of the plurality of access points.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment" "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
    transmitting a request from a computing device to a plurality of access points in a network prompting each access point of the plurality of access points to determine a distance between each pair of access points of the plurality of access points;
    receiving at the computing device the determined distances between each pair of access points of the plurality of access points;
    generating a proximity matrix containing the determined distances between each pair of access points of the plurality of access points;
    solving the proximity matrix to automatically generate a set of locations for the plurality of access points; and
    orienting the generated set of locations for the plurality of access points based on known locations of one or more anchor points in a subset of the plurality of access points.

2. The one or more non-transitory computer-readable storage mediums of claim 1, wherein the determination of the distance between each pair of access points includes measurement of time of flight of signals transmitted between each pair of access points.

3. The one or more non-transitory computer-readable storage mediums of claim 2, wherein the determination of the distance between each pair of access points includes performance of fine timing measurement (FTM) by the plurality of access points.

4. The one or more non-transitory computer-readable storage mediums of claim 1, wherein solving the proximity matrix to generate the set of locations for the plurality of access points includes application of MDS (Multidimensional Scaling).

5. The one or more non-transitory computer-readable storage mediums of claim 1, wherein the instructions further include instructions for:
identifying one or more missing distances between one or more pairs of access points in the proximity matrix; and
calculating or estimating the missing distances based on other distances in the proximity matrix.

6. The one or more non-transitory computer-readable storage mediums of claim 5, wherein estimating the missing distances includes estimating a distance between a first access point and a second access point based on a shortest alternative path between the first access point and the second access point.

7. The one or more non-transitory computer-readable storage mediums of claim 5, wherein solving the proximity matrix with the missing distances includes:
dividing the proximity matrix into a plurality of cliques containing less than all values of the proximity matrix;
solving each of plurality of cliques; and
combining the solutions for the plurality of cliques.

8. The one or more non-transitory computer-readable storage mediums of claim 1, wherein the instructions further include instructions for:
generating a map of the plurality of access points based on the set of locations.

9. The one or more non-transitory computer-readable storage mediums of claim 8, wherein the map of the plurality of access points is a three-dimensional (3D) map.

10. The one or more non-transitory computer-readable storage mediums of claim 9, wherein a number of anchor points is at least three.

11. The one or more non-transitory computer-readable storage mediums of claim 1, wherein the instructions further include instructions for:
repeating the generation of the set of locations for the plurality of access points upon a change in the network.

12. A computing device comprising:
one or more processors;
a memory to store data; and
a transmitter and receiver;
wherein the computing device is to:
transmit a request to a plurality of access points in a network prompting each access point of the plurality of access points to determine a distance between each pair of access points of the plurality of access points;
receive the determined distances between each pair of access points of the plurality of access points;
generate a proximity matrix containing the determined distances between each pair of access points of the plurality of access points;
solve the proximity matrix to automatically generate a set of locations for the plurality of access points; and
orient the generated set of locations for the plurality of access points based on known locations of one or more anchor points in a subset of the plurality of access points.

13. The computing device of claim 12, wherein the determination of the distance between each pair of access points includes measurement of time of flight of signals transmitted between each pair of access points.

14. The computing device of claim 13, wherein the determination of the distance between each pair of access points includes performance of fine timing measurement (FTM) by the plurality of access points.

15. The computing device of claim 12, wherein solving the proximity matrix to generate the set of locations for the plurality of access points includes application of MDS (Multidimensional Scaling) by the computing device.

16. The computing device of claim 12, wherein the computing device is further to:
identify one or more missing distances between one or more pairs of access points in the proximity matrix; and
calculate or estimate the missing distances based on other distances in the proximity matrix.

17. The computing device of claim 16, wherein solving the proximity matrix with the missing distances includes the computing device to:
divide the proximity matrix into a plurality of cliques containing less than all values of the proximity matrix;
solve each of plurality of cliques; and
combine the solutions for the plurality of cliques.

18. A method for automatic generation of access point locations comprising:
transmitting a request from a computing device to a plurality of access points in a network prompting each access point of the plurality of access points to determine a distance between each pair of access points of the plurality of access points, wherein the determination of the distance between each pair of access points includes measurement of time of flight of signals transmitted between each pair of access points;
receiving at the computing device the determined distances between each pair of access points of the plurality of access points;
generating a proximity matrix containing the determined distances between each pair of access points of the plurality of access points;
solving the proximity matrix to automatically generate a set of locations for the plurality of access points; and
orienting the generated set of locations for the plurality of access points based on known locations of one or more anchor points in a subset of the plurality of access points.

19. The method of claim 18, wherein the determination of the distance between each pair of access points includes performance of fine timing measurement (FTM) by the plurality of access points.

20. The method of claim 18, wherein solving the proximity matrix to generate the set of locations for the plurality of access points includes application of MDS (Multidimensional Scaling).

* * * * *